United States Patent Office 3,462,450
Patented Aug. 19, 1969

3,462,450
CHEMICAL COMPOUNDS
Tsung-Ying Shen, Westfield, N.J., assignor to Merck & Co., Inc., Rahway, N.J., a corporation of New Jersey
No Drawing. Filed June 29, 1966, Ser. No. 565,339
Int. Cl. C07d 27/56; A61k 27/00
U.S. Cl. 260—326.12                                                10 Claims

ABSTRACT OF THE DISCLOSURE

There are described new anti-inflammatory compounds comprising 1-aroyl-2-hydroxy or mercaptoindolyl-3-alkanoic acids and the corresponding 2-ethers and thioethers and their esters and amides. The hydroxy compounds are prepared by ring closing chloracetylanilines to 2-oxyindoles, introducing the 3-sidechain by reaction with an oxalate and reducing the keto acid formed, followed by acylation of the indole nitrogen. The mercapto compounds are formed by introduction of a thioacetyl group through a Grignard reagent formed on the 2-position of an indole-3-alkanol ether. This can then be acylated in the 1-position and oxidized to the 3-alkanoic acid.

---

This invention relates to new chemical compounds. More particularly, it relates to a new class of compounds of the indole series. Still more particularly, it is concerned with new α-(3-indolyl) lower aliphatic acids having an aromatic carboxylic acyl radical, including aroyl and heteroaroyl radicals, of less than three fused rings attached to the nitrogen atom of the indole ring and substituted at the 2 position with a hydroxyl or mercapto group, or with an acyl, alkyl (including cycloalkyl) aryl, aralkyl or alkaryl derivative thereof. It is concerned also with salts, amides, anhydrides and esters of such compounds. It relates also to the synthesis of such substances.

The novel aroyl and heteroaroyl 2-substituted-3-indolyl lower aliphatic acids of this invention have the general formula:

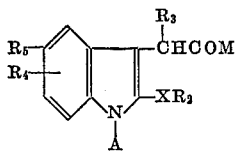

wherein A is a substituted or unsubstituted aromatic homocyclic or heterocyclic carboxylic acid radical, preferably containing less than three fused rings, more specifically an aroyl or heteroaroyl radical of the formula ArC=O wherein Ar is, for example, phenyl, naphthyl or biphenyl, or the formula HetC=O wherein Het is, for example, furyl, thienyl, pyrryl, thiazolyl, thiadiazolyl, pyrazinyl, pyridinyl, quinolyl, isoquinolyl, pyrazolyl, imidazolyl, oxazolyl, pyrimidinyl or a benz derivative thereof such as benzisoxazolyl, benzimidazolyl, benzofuranyl, benzothiazolyl, benzotriazolyl, benzoxazolyl, benzothienyl, indazolyl or isoindazolyl; X is oxygen or sulfur; $R_2$ is hydrogen, lower alkyl, aryl, ar-lower alkyl, acyl or cyclolower alkyl; $R_3$ is hydrogen, amino, substituted amino (i.e. mono or di-lower alkyl amino) or a lower alkyl radical containing, for example, up to 6 carbon atoms, such as methyl, ethyl, propyl, isopropyl, butyl, isobutyl, pentyl or hexyl; $R_4$ is hydrogen, halogen, or a lower alkyl, lower alkoxy or trifluoromethyl radical; $R_5$ is hydrogen, lower alkyl, lower alkoxy, nitro, amino, lower alkylamino, di(lower alkyl) amino, haloalkyl, lower alkanoylamino, lower alkanoyl, bis (hydroxy lower alkyl) amino, 1-pyrrolidino, 4-methyl-1-piperazinyl, 4-morpholino, cyano, amino lower alkyl, di (lower alkyl) amino lower alkyl, trifluoromethyl, hydroxyl, halogen, di(lower alkyl) sulfamyl, benzylthio, benzyloxy, lower alkylbenzyloxy, lower alkoxybenzyloxy, lower alkenyl, lower alkenyloxy, cyclopropyl, 1-azacyclopropyl, cyclopropyl lower alkoxy or cyclobutyl lower alkoxy; and M is hydroxyl, amino, substituted amino (such as lower alkylamino, di-lower alkylamino, lower alkenylamino, ar-lower alkylamino, arylamino, haloarylamino and the like), lower alkoxy, lower alkenyloxy, lower alkynyloxy, aryloxy cyclic lower alkoxy, lower alkenyloxy, lower alkynyloxy; substituted derivatives thereof; and OZ wherein Z is a cation including metals such as alkali or alkaline earth metals or OY where Y may be represented by the formula:

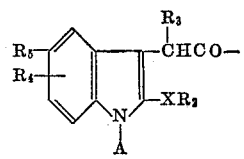

wherein A, X, $R_2$, $R_3$, $R_4$, and $R_5$ are as defined above.

Typical substituents which may be represented by M include methylamino, ethylamino, butylamino, dimethylamino, diethylamino, allylamino, phenethylamino, N-ethylphenethylamino, benzylamino, anilino, p-chloroanilino, p-methoxyanilino, piperidino, pyrrolidino, morpholino, 1-methylpiperazino, N-phenylpiperazino, 1-(β-hydroxyethyl) - piperazino, 1-methyl-2-aminomethylpyrrolidino, 1-ethyl-2-aminomethyl piperidino, tetrahydrofurfurylamino, N-carbobenzyloxymethylamino, N,N-dimethylcarboxamidomethyl, 1,2,5,6-tetrahydropyridino, methoxy, ethoxy, n-butoxy, t-butoxy, ethoxyethoxy, phenoxy, benzyloxy, diphenylmethoxy, triphenylmethoxy, cyclopropoxy, β-diethylaminoethoxy, β-dimethylaminoethoxy, phenethoxy, allyloxy, isopropoxy, 4-dimethylaminocyclohexyloxy, cyclopropylmethoxy, tetrahydrofurfuryloxy, cyclohexyloxy, cyclopentyloxy, cyclopropylethoxy, p-acetaminophenoxy, o-carboxyphenoxy, polyalkoxy lower alkyl such as the polyalkyl ethers derived from sorbitol, mannitol or other sugar alcohols containing up to six carbon atoms in the basic chain.

The invention also includes within its scope compounds wherein M is a cyclic lower alkylamino lower alkyl radical derived from N-(β-hydroxyethyl) piperidine, N-(β-hydroxyethyl) pyrrolidine, N-(hydroxymethyl) pyrrolidine, N-(β-hydroxyethyl) morpholino, N-methyl-2-hydroxymethyl pyrrolidine, N - methyl - 2 - hydroxymethyl piperidine, N-ethyl-3-hydroxy-piperidine, 3-hydroxyquinuclidine, N-(β-hydroxyethyl)-N'-methyl-piperazine and the like.

Many compounds within the scope of the above definition are basic in nature and may be readily converted to acid addition salts. It is specifically intended to include those salts which are pharmaceutically acceptable within the purview of the invention. Such salts are formed by reaction between a free base of this invention and an acid having a pharmaceutically acceptable anion. The term "pharmaceutically acceptable anion" has a definite meaning to one skilled in the art. It is defined as a non-toxic anion of any of the simple acids used therapeutically to neutralize basic medicinal agents when the salts thereof are to be utilized therapeutically. These acids include both inorganic and organic acids as for example, hydrochloric, hydrobromic, hydriodic, sulfuric, succinic, phosphoric, maleic, tartaric, citric, glycolic and others. The pharmaceutical activity of the molecule is primarily a function of the cation. The anion serves primarily to supply electrical neutrality.

In the preferred compounds of this invention, A is benzoyl and substituted at the para position with chlorine, X is oxygen or sulfur, $R_2$ is hydrogen or lower alkyl, $R_3$ is hydrogen or lower alkyl, $R_4$ is hydrogen and $R_5$ is lower alkyl, lower alkoxy, fluoro or substituted amino such as dimethylamino.

A feature of these compounds is the presence of an aroyl or heteroaroyl radical attached to the N–1 position of the indole. Thus, suitable aroyl substituents are the benzoyl and naphthoyl groups, and suitable heteroaroyl substituents include furoyl and isonicotinoyl. The aromatic rings of such groups may contain at least one substituent. This substituent may be lower alkyl or functional substituents such as hydroxy or an etherified hydroxy (hydrocarbonoxy) group such as a lower alkoxy, e.g., methoxy, ethoxy, isopropoxy, allyloxy, propoxy, an aryloxy or aralkoxy group, e.g., phenoxy, benzyloxy, halobenzyloxy, lower alkoxybenzyloxy and the like. It may be a nitro radical, a halogen such as chlorine, bromine, iodine or fluorine, an amino group or a substituted amino group, representative examples of which that might be mentioned are acylamino, amine oxide, ketimines, urethanes, lower alkylamino, lower dialkylamino, amidine, acylated amidines, hydrazine or a substituted hydrazine, alkoxyamines and sulfonated amines. Further, it may be a mercapto or a substituted mercapto radical of the type exemplified by alkylthio groups such methylthio, ethylthio, and propylthio and aralkylthio (ar-lower alkylthio) or arylthio groups, e.g., benzylthio and phenylthio. The N–1 aroyl radical may, if desired, be haloalkylated (halolower alkyl, di-halo-lower alkyl, tri-halo-lower alkyl), as with a trifluoromethyl, trifluoroethyl, perfluoroethyl, β-chloroethyl or like substituent, acylated (lower alkanol, ar-lower alkanoyl) as with acetyl, propionyl, benzoyl, phenylacetyl, trifluoroacetyl and like acyl groups, or it may contain a halo-lower alkoxy or halo-lower alkylthio substituent. In addition, the invention embraces compounds wherein the aroyl radical contains a sulfamyl, benzylthiomethyl, cyano, or dialkylsulfamyl radical. Further, it may contain a carboxy substituent, or a derivative thereof, such as an alkali metal salt or a lower alkyl ester of the carboxy radical (carb-lower alkoxy), an aldehyde derivative of the type represented by acetals or thioacetals. In the preferred compounds, the N–1 aroyl radical is benzoyl and the functional substituent is in the para position of the six-membered ring.

As aforesaid, the N–1 group may be a heteroacyl substituent, and more precisely a heteroaroyl substituent of the formula:

wherein Het represents a five- or six-membered hetero aromatic ring which may be part of a fused ring system containing less than three fused rings.

The α-(3-indolyl) lower aliphatic acids described herein are preferably α-(3-indolyl) derivatives of acetic, propionic, butyric, valeric and like acids. Esters, salts, amides and anhydrides of such aliphatic acids represent an additional aspect of the invention.

The salts of these new α-(1-acylated-2-substituted-3-indolyl) lower aliphatic acids can be obtained by treatment of the free acid with an appropriate base under mild conditions. In this manner there may be obtained alkaline metal salts such as the sodium and potassium salts, the aluminum or magnesium salts or salts of alkaline earth metals, examples of which are barium and calcium. Salts of organic amines such as dimethylamine, morpholine, methyl cyclohexylamine or glucosamine may be obtained by reacting the acid with the appropriate organic base.

The esters are important intermediates in the synthesis of the free acid, and in many cases are themselves of importance as end products. Among the preferred esters are the lower alkyl esters such as methyl, ethyl, propyl or t-butyl esters and aralkyl esters such as benzyl, p-halobenzyl and like esters having less than nine carbon atoms.

The following compounds are illustrative of those contemplated by this invention. These and others may be prepared by the procedures discussed hereinbelow:

1-(p-chlorobenzoyl)-5-methoxyoxindole-3-acetic acid;
methyl-α-[1-(p-trifluoromethylbenzoyl)-5-(dimethylamino)-3-oxindolyl]propionate;
tetrahydrofurfuryl-α-[1-(N,N-dimethyl-p-carboxamidobenzoyl)-5-acetyl-3-oxindolyl]-α-methyl acetate;
α-[1-(thiazole-4-carbonyl)-2-phenyloxy-5-methyl-6-fluoro-3-indolyl]propionic anhydride;
α-[1-(β-naphthoyl)-2-cyclopropylethoxy-5-(N-methylacetamido)-3-indolyl]pentanoic acid;
α-[1-(o-methyl-p-methylthiobenzoyl)-2-(n-butoxy)-5-(4-morpholinyl)-3-indolyl]propionamide;
β-diethylaminoethyl-α-[1-(2-thenoyl)-2-cyclohexyloxy-5-methylthio-3-indolyl]-α-propionate;
ethyl-[1-(2-methylmercaptothiazole-4-carbonyl)-2-phenylthio-4-fluoro-5-methoxy-3-indolyl]acetate;
N,N-diethyl-α-[1-(2,4-dichlorobenzoyl)-5-trifluoromethyl-3-oxindolyl]isobutyramide;
α-[1-nicotinoyl-2-mercapto-4-fluoro-5-methoxy-3-indolyl]-α-isobutyl acetic acid;
(N′-methylpyrrolidinyl-2)-methyl-α-[1-(benzofuranyl-3-carbonyl)-2-methylthio-5-(p-benzyloxy)-3-indolyl] propionate;
methyl-[1-(pyrazolyl-4-carbonyl)-2-acetoxy-5-(allyl-3-indolyl]acetate;
α-[1-(5-chloro-2-furoyl)-2-cyclopentylthio-5-diethylaminoethyl-3-indolyl]propionic acid.

The α-(3-indolyl) lower aliphatic acids and derivatives thereof described herein are synthesized by acylation of the selected lower aliphatic acid, ester or anhydride having the desired substituents on the indolyl nucleus of the α-(3-indolyl substituted) aliphatic acid or derivative. It is preferred to carry out the acylation on an ester derivative of the aliphatic acid. In those cases where the free acid is desired, the ester may be converted under suitable reaction conditions to the free acid.

It has been observed that the 1-aroyl or heteroaroyl substituent is easily hydrolyzed under conditions normally employed for saponification of an ester to the free acid. For this reason, care must be taken in converting the esters to the corresponding free acids. It has been found that one convenient method of accomplishing this conversion comprises acylation of the benzyl ester and subsequent hydrogenolytic removal of the benzyl group. Alternatively, other esters such as the t-butyl esters, which are amendable to selective removal by other treatment, such as heating above 210° C. or by treating at 25–110° C., with a catalytic amount of an aryl sulfonic acid or other like acids may be utilized. When, instead of an ester, the amides of these acids are prepared, the free acids are formed by reaction of these amides with a stoichiometric quantity of nitrous acid in an inert solvent.

The acylation reaction is preferably conducted by treating the α-(3-indolyl) lower aliphatic acid starting material with an alkali metal hydride such as sodium hydride to form, e.g., a sodium salt and then intimately contacting said salt with an aroyl or heteroaroyl acid halide in an anhydrous solvent medium. It is preferred to employ solvents such as dimethylformamide, dimethylformamide-benzene, benzene, toluene or xylene. It is preferred to carry out the acylation at about room temperature although lower temperatures may be employed if the particular reactants are unduly susceptible to decomposition.

An alternative method of acylating the 1-position is by use of a phenolic ester of the acylating acid, such as the p-nitrophenyl ester. These esters are prepared by mixing the acid and p-nitrophenol in tetrahydrofuran and adding dicyclohexyl carbodiimide in tetrahydrofuran slowly. The dicyclohexylurea which forms is removed by filtration and the nitrophenylester is recovered from the filtrate. Alternatively, there can also be used the anhydride, azide, phenolic or thiophenolic ester of the acylating acid. Whichever agent is used, the acylation of the α-(3-indolyl)-lower aliphatic acid starting material is achieved by forming an alkali metal salt of the indolyl compound with, for example, sodium hydride, in an anhydrous solvent and adding the acylating agent.

The α-(1-aroyl or heteroaroyl-3-indolyl) lower aliphatic acid compounds and derivatives of this invention have a high degree of anti-inflammatory activity and are effective in the prevention and inhibition of granuloma tissue formation. Certain of them possess this activity in high degree and are of value in the treatment of arthritic and dermatological disorders and in like conditions which are responsive to treatment with anti-inflammatory agents. In addition, the compounds of this invention have a useful degree of antipyretic activity. For these purposes, they are normally administered orally in tablets or capsules, the optimum dosage depending, of course, on the particular compound being used and the type and severity of infection being treated. Although the optimum quantities of these compounds of this invention, to be used in such manner, will depend on the compound employed and the particular type of disease condition treated, oral dose levels of preferred compounds in the range of 10–4000 mg. per day are useful in control of arthritic conditions, depending on the activity of the specific compound and the reaction sensitivity of the patient.

The presently preferred process of synthesizing the subject α-(3-indolyl) lower aliphatic acids comprises reacting a substituted aniline with chloroacetic acid to produce a chloroacetyl-substituted aniline which is then cyclized to form a substituted oxindole, introducing a carboxylic acid residue at the three position by treating the oxindole with an oxalate, producing an isatylidenehydroxy-α-lower aliphatic ester which is then hydrogenated to form an oxindolyl ester, acylating at the N–1 position of the indole nucleus of the hydrogenated ester with an aromatic carboxylic acyl radical (aroyl or heteroaroyl) and hydrolyzing the ester to its corresponding acid.

The process may be illustrated by the following reaction sequence which shows the preparation of α-[1-(p-chlorobenzoyl)-5-methoxy-3-oxindolyl]acetic acid:

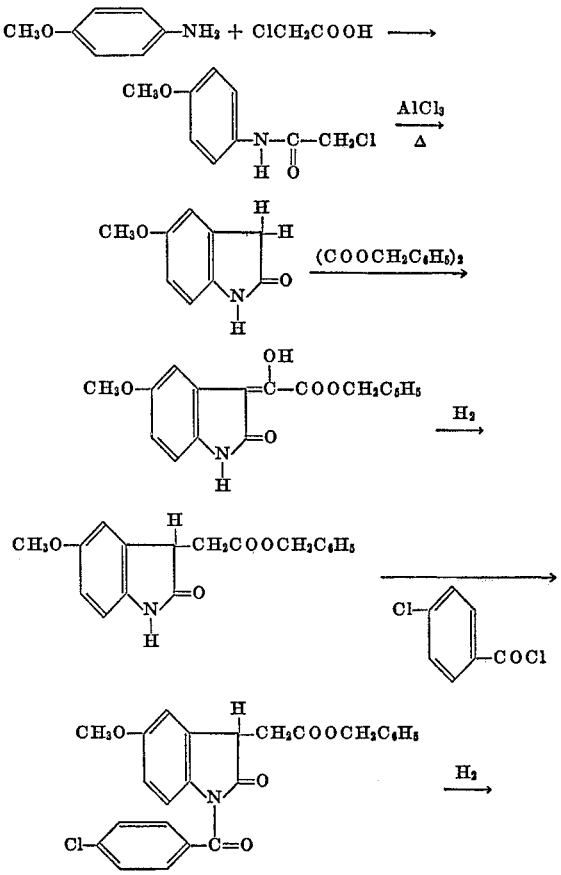

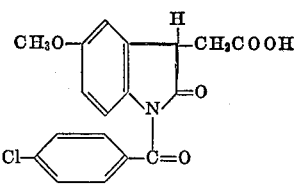

This last product is the keto form of a keto-enol equilibrium structure.

The enol form is depicted thus:

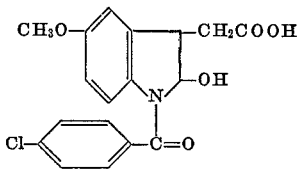

This tautomeric structure explains the reaction of these oxindolyl acids with halides to form ether and thioether compounds, as demonstrated in the examples. All of the compounds of this invention with an oxindolyl designation may thus also be referred to as 2-hydroxy-3-indolyl products.

The chloracetyl-substituted aniline reaction of the preferred process is prepared by the reaction of the appropriately substituted arylamine with chloroacetyl chloride in a reaction inert solvent including ethers, for instance dioxane, or an alcohol. Cyclization of the resulting amine is effected by means of acidic catalysts, including Lewis acids such as aluminum chloride and stannic chloride, or mineral acids such as hydrochloric and sulfuric. The reaction is preferably carried out at a temperature of from about 100° C. to 250° C., over a period of from ½ to 6 hours. The product may be isolated in any convenient manner, such as solvent extraction, chromatography and/or distillation.

It is to be noted that proper selection of the aniline component in the above reaction will yield an appropriately substituted indole as a product. The only restriction is that in the starting aniline, at least one ortho-position be unsubstituted in order to allow the indole to be formed. After cyclization, a substituent on the substituted ortho-position of the aniline will be found on the 7-position of the indole and substituents at a meta carbon will be found on the 4- and 6-position of the product, with separation possible, most conveniently, by chromatography. Of course a para-substituted aniline will produce only the 5-substituted indole.

This oxindole is then reacted with an oxalate ester in an inert solvent, preferably benzene, in the presence of a base such as sodium alkoxide or sodium hydroxide. An excess of the oxalate and a nitrogen atmosphere will improve the yield of the reaction, which takes place at temperatures of from about 10° C. to about 80° C. The product will depend upon the ester used; lower alkyl esters are preferred when the oxindole ester is desired as the final compound, but when benzyl or tert-butyl oxalates are employed, as indicated heretofore, the final product can be the acid.

This isatylidenehydroxy carboxylic acid ester is then selectively hydrogenated to eliminate the double bond and the α-hydroxy radical and produce the corresponding oxindole ester. By controlling the conditions of the reactions and the amount of hydrogen absorbed (2 moles) only these positions will be effected. Thus it is preferred that hydrogen at about 1 atmosphere and at temperatures of about 20° C.–40° C. be used with a catalyst present, suitably palladium on charcoal.

The product of the above reaction, a substituted 3-oxindolyl acetate is then acylated, in the manner heretofore described, to produce a substituted 1-acylated-3-oxindolyl acetic acid ester of the invention. It is preferred to have a slight excess of both the alkali metal hydride (sodium is the preferred cation) and the acylating agent, to effect as complete a conversion as possible. As previously indicated, use of the proper oxalate ester (e.g., the t-butyl or benzyl compounds previously described) will allow the conversion to the corresponding acid, and thence other derivatives if desired, to be accomplished without disturbing the acyl group at N–1.

Alternately, when it is desired to have one of the alpha hydrogens of the oxindole compound substituted by a lower alkyl radical, it is preferred to react the substituted oxindole obtained from the cyclization reaction described above with an α-olefinic lower carboxylic acid having a reactive group, suitably the acetamine radical on the α-carbon of the acid. Thus, when acetaminoacrylic acid is heated with the oxindole compound in a polar oxygenated solvent, preferably a lower alkanol, at a temperature of from about 50° C. to about 120° C. during a period of from about 3 to about 12 hours, an α-substituted isatylidene acetic acid compound is produced. This product is identical to the isatylidenehydroxy compound produced heretofore, except that the α-hydroxy radical is replaced by an alkyl group.

This α-alkyl-α-(oxindole-3) acetic acid is then esterified by reaction with a lower alkanol or benzyl alcohol, in a reaction inert solvent, including ethers, such as dimethoxyethane or tetrahydrofuran. Excess anhydrous alcohol may be used as the solvent as well. The reaction is carried out from about −10° C. to about 25° C. for from about one to six hours.

This ester is then hydrogenated to produce the corresponding saturated oxindole ester. Again, by carefully controlling the reduction conditions only the selective hydrogenation desired (absorption of only 1 mole of gas is required) will be effected. The preferred environment is hydrogen at about one atmosphere, a temperature of about 20° C. to 50° C. with an inert catalyst, suitably 10% palladium-on-carbon, present.

The product of this reaction, a substituted α-alkyl-α-oxindole-3-acetate is then acylated in the same manner as was the α-unsubstituted compound hereinbefore mentioned.

In order to produce the 2-mercapto compounds of the invention, a series of reactions takes place illustrated by the following sequence showing the preparation of (1-benzoyl-2-mercapto-5-fluoro-3-indolyl) acetic acid:

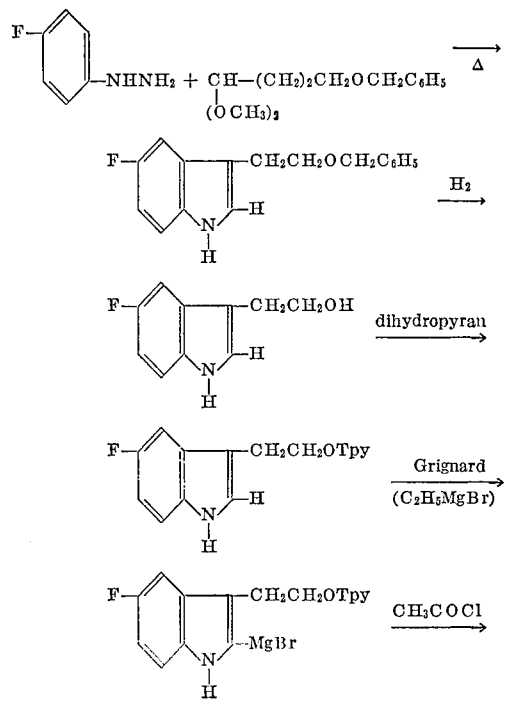

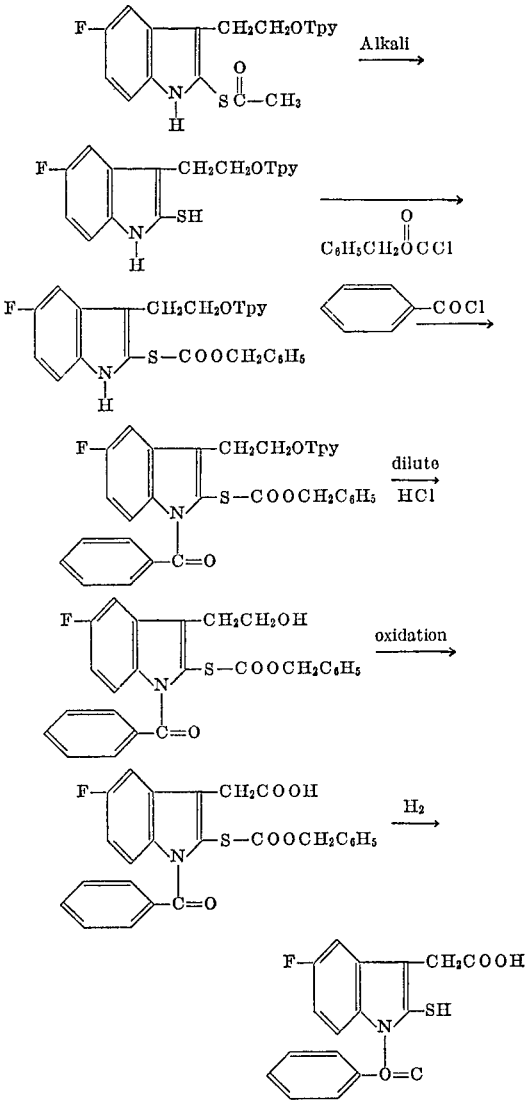

In the first step, a dialkoxy acetate of a γ-hydrocarboxy lower alkyl aldehyde, which might be also referred to as an acetal of an etherified lower alkanol, such as 4,4-dimethoxy butyl benzyl ether, is reacted with the selected phenylhydrazine to form a phenylhydrazone, which is cyclized in situ to the corresponding indole. The reaction is normally carried out in a lower alkanol, such as methanol, ethanol or butanol, but preferably in the solvent having the same alkyl moiety as the acetal to avoid side reactions, and at a temperature of from about 50° C. to about 120° C., during a period of from about three to about eight hours. It is most convenient to reflux the mixture at the boiling point of the selected alcohol solvent. The use of an inert atmosphere such as nitrogen helps to increase yields. The indolyl ether is recovered by any suitable technique, such as distillation or solvent extraction and evaporation.

The protecting ether group is then removed in any suitable manner. Thus, for example, if the ether radical is benzyl, it can be removed by hydrogenation, preferably in the presence of a catalyst such as palladium-on-carbon. Etherifying groups having a tertiary carbon bonded to the oxygen decompose readily in acid solution to produce the free indolyl alcohol.

The thus-formed compound is then re-etherified, but by a reagent which will protect the hydroxyl group from interaction in the subsequent processes and which can be conveniently removed when its presence is no longer required. 2,3-dihydropyran is preferred for this purpose.

The use of a Grignard reagent on the active hydrogen at the 2-position of this 3-indolyl ether and subsequent reaction with sulfur and an acylating agent, followed by treatment with alkali, produces a 2-thioalcohol. This mercapto group must be protected during the next step, acylation at the N–1 position. This is most conveniently accomplished via a radical which can be easily removed to regenerate the mercapto group, suitably a carbobenzyloxy compound. When an acyl group is to be left in position, any desired agent may be selected. Thus with both alcoholic groups protected, acylation at the N–1 position is accomplished in the manner hereinbefore described.

The desired α-(1-acylated-2-mercapto-3-indolyl) lower aliphatic acids of the invention are then produced by first regenerating the alcohol at the 3-position with dilute hydrochloric acid in the cold and then oxidizing to the aldehyde. This is preferably done with dicyclohexyl-carbodiimide and dimethyl sulfoxide in a reaction inert organic solvent, suitably benzene, at about 15° C. to about 35° C., for about 15 to about 30 minutes. Up to a 5 molar excess of the carbodiimide reagent and a 1:4 to a 1:1 sulfoxide-acid mole ration, together with a catalytic amount of phosphoric acid present, will give good yields of the intermediate aldehyde. Further oxidation to the corresponding indole acid is preferably done via the silver oxide method, wherein silver nitrate in dilute ammonium hydroxide is the oxidizing medium, at 15° C. to 50° C. The reaction is complete when no more silver is precipitated upon addition of more reagent.

The acid salt, the product of this reaction, is then converted to the free acid in any convenient manner. When the protecting group at the 2-position is removed, (for example, the carbobenzyloxy radical is displaced by hydrogenation, preferably at about 15° C. to about 35° C. and atmospheric pressure, with a catalyst of palladium-on charcoal present), the desired α-(1-acylated-2-mercapto-3-indolyl) lower aliphatic acids and substituted acids are produced.

The 2-substituted ethers of the invention are obtained by the reaction of the enol form of an oxindolyl compound, preferably the ester, with an alkali metal, suitably potassium, to form the corresponding alkali compound and then with a hydrocarbon halide, preferably the bromide, to produce a 2-ether indolyl product. By treating alkyl sulfinyl halide, preferably the chloride, with an α-(1-acylated-3-indolyl) lower aliphatic acid or derivative which may be converted to the acid, a 2-thioether of the invention is synthesized.

This indolyl starting compound is prepared by the Fischer indole synthesis previously described, the reaction taking place between a selected phenylhydrazine on a lower aliphatic compound, preferably the ester or acid having an aldehyde group on the γ-carbon of the acid moiety. It is preferable to use this aldehyde in the form of its dialkoxy acetal, such as γ,γ-dimethoxy butyric acid. If an ester of the acetal is used in the indole preparation, the acylation step, to produce the required starting material of the 2-thioether compound, may be accomplished immediately after indolization, with subsequent hydrolysis to produce the corresponding acid. As mentioned hereinbefore, this conversion must be effected without disturbing the acyl group at the 1-position and may be accomplished by the use of selective esterifying agents.

Compounds of this invention with an alpha substituent such as hydroxyl, amino or substituted amino can be prepared. The starting material, an oxindole or substituted oxindole, is treated with oxalic acid or a derivative thereof, the dichloride being preferred and the resulting compound reacted with a reagent to protect the carboxylic radical; as indicated previously, esterification serves this purpose admirably. The thus formed α-keto group of the oxindole ester can be reduced to a hydroxyl group or to an amino group, via the oxime which, in turn, can have the amino hydrogens substituted by alkyl groups by reaction with alkyl halide.

In either case, acylation of the N–1 position, subsequent to the above described reaction, will produce a desired compound.

As indicated heretofore, other derivatives are prepared by reacting the acids with appropriate reagents. For example, an α-(1-acylated-3-oxindolyl) lower aliphatic acid may be converted to the corresponding amide by reaction of the acid in the form of its anhydride, mixed anhydride or in the presence of dicyclohexyl carbodiimide with ammonia or primary or secondary amines in an inert solvent such as dimethoxyethane tetrahydrofuran and a temperature range of from about 0° C. to about 50° C. is preferred for the reaction period of from about ½ to six hours.

The reactions of these acids with metallic salts and organic amines, as indicated heretofore, represent another aspect of this invention. These neutralization reactions are preferably carried out with a slight excess of the basic reagent present to insure a good conversion yield, at temperatures of from 0° C. to about 50° C.

When an ester group is sought at the 2-position, the oxindole compound may be treated by the selected acylating agent in the manner well known in the art.

Anhydrides of the acids represent an additional aspect of the invention. The symmetrical anhydride is prepared by intermolecular dehydration of the acid, accomplished by the use of a mild dehydrating agent, dicyclohexyl-carbodiimide being the most suitable. A mixed anhydride is formed by the action of a tertiary base such as a tertiary alkylamine, pyridine or the like on the free acid and the reaction of the resulting amine salt with an alkyl or acyl chloroformate, phosphorous oxychloride, thionyl chloride or similar reagent.

The synthesis of various compounds of this invention having on the indole ring system a 5-substituent which has a nitrogen atom attached to the homocyclic ring of the indole is generally based on the 5-nitro compound. This is transformed into the desired 5-substituent. Such transformation may be before or after acylation of the 1-position, depending on the extent to which the desired 5-substituent may interfere with the acylation. If such interference is possible, the acylation should be carried out on the 5-nitro compound and the nitro later transformed into the desired 5-substituent. Such transformation can be carried out in a number of ways. Reduction of the 5-nitro group yields the 5-amino group. Reaction of the amino with alkyl halides gives mono and dialkyl amino groups. If the alkyl halide is a dihaloalkylene group (e.g., 1,4-dibromobutane), a heterocyclic ring (e.g. pyrrolidino) is formed. Similarly, bis-(β-chloroethyl) ether gives an N-morpholino compound. Alkylation can also be carried out simultaneously with reduction, as with formaldehyde and hydrogen. Acylation can similarly be carried out on the 5-amino or nitro compounds (with simultaneous reduction on the latter) to give 5-acylamido compounds. The 5-amino group can be reacted with isocyanates to give 5-ureido compounds.

The procedures outlined above may be altered somewhat without departing from the spirit and scope of this invention. Each one of the procedures is not necessarily applicable to the preparation of all the compounds within the scope of the invention. Thus, for example, there may be substituted at the 5-position or on some other position of the indole nucleus a group which would interfer with acylation at the 1-position. Problems such as this may be avoided by appropriate selection of the procedure to be utilized or of the order in which the reactions are performed. And, if feasible, the use of blocking groups in accordance with standard practice may be employed.

This invention can be illustrated by the following non-limiting examples.

EXAMPLE 1

(A) 5-methoxyoxindole

A mixture of 0.02 mole of p-chloroacetyl anisidide (prepared by the reaction of p-methoxyaniline and chloroacetic acid) and 0.04 mole of aluminum chloride is heated for one hour at 225° C. After treatment with hydrochloric acid to isolate the residue, the latter is washed with a small amount of cold methanol to produce 5-methoxyoxindole.

Similarly by beginning with different p-substituted aniline chloroacetyl compounds, the following compounds are prepared:

5-fluorooxindole;
5-chlorooxindole;
5-nitrooxindole;
5-benzyloxyoxindole;
5-methyloxindole;
5-cyanooxindole;
5-isopropoxyoxindole;
5-trifluoromethyloxindole;
5-cyclopropylmethoxyoxindole.

(B)

When 0.02 mole of o-chloroacetylanisidide is used in the above procedure, the two isomers which are obtained, 4-methoxyoxindole and 6-methoxyoxindole, may be separated by chromatography.

(C)

When an equivalent amount of 3-trifluoromethyl-4-nitrochloroacetylaniline, 3-trifluoromethyl - 4 - methoxychloroacetylaniline or 3-trifluoromethyl - 4 - fluorochloroacetylaniline is employed in the above procedure, both isomers of each are obtained, namely:

4-trifluoromethyl-5-nitrooxindole;
5-nitro-6-trifluoromethyloxindole;
4-trifluoromethyl-5-methoxyoxindole;
5-methoxy-6-trifluoromethyloxindole;
4-trifluoromethyl-5-fluorooxindole;
5-fluoro-6-trifluoromethyloxindole.

EXAMPLE 2

5-dimethylaminooxindole

A total of 0.01 mole of 5-nitrooxindole, 150 ml. of methanol, 15 ml. of glacial acetic acid and 5 ml. of 37% aqueous formaldehyde are reduced in a 40 p.s.i. hydrogen atmosphere at room temperature in the presence of about 4 g. of Raney nickel catalyst. After the theoretical amount of hydrogen has reacted, the reaction mixture is filtered, concentrated in vacuo to a small volume and diluted with ether. The ether solution is washed with sodium bicarbonate, then with water and dried over anhydrous sodium sulfate to produce 5-dimethylaminooxindole.

EXAMPLE 3

Benzyl-(5-methoxy-3-oxindolyl) acetate

Add 100 ml. of a solution of dry benzene containing 0.05 mole of 5-methoxyindole and 0.07 mole of dibenzyl oxalate to 50 ml. of benzene containing 1.5 g. of sodium powder. Stir the mixture for three hours under nitrogen, then dilute with ice-water to dissolve the precipitate which formed during stirring and extract with ether. Acidify the aqueous layer with cold concentrated hydrochloric acid to produce a precipitate of benzyl-5-methoxy isatylidene-hydroxy-acetate. After filtration, the precipitate is hydrogenated in 200 ml. of glacial acetic acid containing 1 ml. of concentrated sulfuric acid and 5 g. of a 10% palladium-on-charcoal catalyst. After 2 moles of hydrogen are absorbed, the reduction is stopped and the reaction mixture filtered into 4 g. of sodium acetate, the solvent removed in vacuo, the residue extracted with ether and water and the ethereal portion dried and concentrated to a low volume. Upon the addition of petroleum ether, a precipitate of benzyl-(5-methoxy-3-oxindolyl) acetate is produced.

Similarly, by substituting diethyl oxalate in the above procedure or by using any of the other substituted oxindoles, the following compounds are prepared:

ethyl-(5-methyl-3-oxindolyl) acetate;
benzyl-(5-dimethylamino-3-oxindolyl) acetate;
ethyl-(5-fluoro-3-oxindolyl) acetate;
benzyl-(4-trifluoromethyl-5-nitro-3-oxindolyl) acetate.

EXAMPLE 4

Methyl-α-(5-methoxy-3-oxindolyl) propionate

A total of 0.3 mole of sodium is dissolved in 300 ml. of absolute ethanol. 5-methoxyoxindole (0.1 mole) and 0.1 mole of α-acetaminoacrylic acid are added and the mixture is refluxed for six hours under nitrogen. The precipitated sodium salt is filtered, washed with ethanol and dissolved in 100 ml. of glacial acetic acid. The solution is warmed and 200 ml. of 50% hydrochloric acid added, to produce a precipitate of 5-methoxy-isatylidene-methylacetic acid. After filtration, a suspension of the preparation, 7 ml. of distilled thionyl chloride and a drop of pyridine in 40 ml. of absolute ether is stirred for one hour at room temperature, then chilled to 0° C. Anhydrous methanol (10 ml.) is added, with stirring. After 2 hours at 0° C., the mixture is filtered and the filtrate washed successively with ether, 50% methanol and water to produce methyl (5-methoxy-isatylidene)-methylacetate. This precipitate is added to 100 ml. of methanol containing 1 g. of a 10% palladium-on-charcoal catalyst. The mixture is reduced with hydrogen at one atmosphere. After one mole of hydrogen has been absorbed, the reaction mixture is filtered and the filtrate concentrated in vacuo to a small volume. Upon the addition of 10 ml. of water, a precipitate of methyl-α-(5-methoxy-3-oxindolyl) propionate is produced.

By substituting other alcohols in the above procedure with other substituted oxindoles the following esters are produced:

n-propyl-α-(5-fluoro-3-oxindolyl propionate;
t-butyl-α-(5-nitro-3-oxindolyl propionate;
benzyl-α-(5-methyl-3-oxindolyl) propionate;
ethyl-α-(5-dimethylamino-6-trifluoromethyl-3-oxindolyl) propionate.

Similarly, by substituting the higher homologues of A₅acetaminoacrylic acid in the above procedure, the following compounds are prepared:

methyl-α-(5-benzyloxy-3-oxindolyl)-n-butyrate;
isopropyl-α-(5-chloro-3-oxindolyl)-α-isopropyl acetate;
p-acetaminophenyl-α-(5-fluoro-3-oxindolyl)-octanoate;
tetrahydrofurfuryl-α-(5-methoxy-3-oxindolyl pentanoate.

EXAMPLE 5

Benzyl-α-[1-(p-chlorobenzoyl)-5-methoxy-3-oxindolyl] acetate

Add 0.04 mole of benzyl-5-methoxy-3-oxindolyl acetate in 150 ml. of dimethylformamide to 0.08 mole of a 51% sodium hydride-mineral oil mixture in 150 ml. of distilled dimethylformamide (DMF), in a one liter 3-necked flask. The mixture is allowed to stir at 0° C. for one hour and then 0.05 mole of p-chlorobenzoyl chloride in 50 ml. of DMF is added dropwise over a period of thirty minutes.

The reaction mixture is stirred for another half-hour at 0° C., allowed to stand for twelve hours at 0° C. and then filtered. The solids are washed with ether and the washings are added to the filtrate. The latter is washed with water and dried over sodium sulfate, the salt filtered off and the filtrate concentrated to dryness. The residue is chromatographed to give benzyl-[1-(p-chlorobenzoyl)-5-methoxy-3-oxindolyl] acetate.

By using the above procedure, the following compounds are prepared:

ethyl-[1-(p-chlorobenzoyl)-5-fluoro-3-oxindolyl] acetate;
benzyl-[1-(p-chlorobenzoyl)-5-methyl - 3 - oxindolyl] acetate;
methyl-α-[1-(p-chlorobenzoyl)-5-dimethylamino-3-oxindolyl] propionate;
ethyl-α-[1-(p-chlorobenzoyl)-5-chloro-3-oxindolyl] n-butyrate;
n- propyl-[1-(p-chlorobenzoyl)-5-benzyloxy-3-oxindolyl]-α-t-butyl acetate;
t-butyl-[1-(p-chlorobenzoyl)-5-trifluoromethyl-3-oxindolyl]-α-sec-butyl acetate.

EXAMPLE 6

The procedure of Example 5 is followed using the following aroyl and heteroaroyl chlorides in place of p-chlorobenzoyl chloride to produce the corresponding N–1 aroyl and heteroaroyl derivatives of the 3-oxindolyl esters:

benzoyl chloride
p-methylthiobenzoyl chloride
3,4,5-trimethoxybenzoyl chloride
p-phenoxybenzoyl chloride
p-trifluoroacetylbenzoyl chloride
p-N,N-dimethylsulfamylbenzoyl chloride
3-furoyl chloride
1-methylimidazol-5-carboxylic acid chloride
1,3-dimethyl-2,3-dihydro-2-oxoimidazole-4-carboxylic acid chloride
1-methyl-benzimidazole-2-carbonyl chloride
5-fluoro-2-thenoyl chloride
3-thenoyl chloride
5-nitro-2-furoyl chloride
nicotinoyl chloride
1-methyl-indazole-3-carbonyl chloride
1-methyl-6-nitro-indazole-3-carbonyl chloride
oxazole-4-carbonyl chloride
benzoxazole-2-carbonyl chloride
thiazole-4-carbonyl chloride
thiazole-2-carbonyl chloride
2-phenylthiazole-4-carbonyl chloride
2-benzylmercaptothiazole-4-carbonyl chloride
p-acetylbenzoyl chloride
N,N-dimethyl-p-carboxamidobenzoyl chloride
p-cyanobenzoyl chloride
p-carbomethoxybenzoyl chloride
p-formylbenzoyl chloride
p-trifluoromethylthiobenzoyl chloride
N,N-dimethyl-p-sulfonamidobenzoyl chloride
p-methylsulfinylbenzoyl chloride
p-methylsulfonylbenzoyl chloride
p-benzylthiobenzoyl chloride
p-acetylmercaptobenzoyl chloride
p-nitrobenzoyl chloride
p-dimethylaminobenzoyl chloride
p-acetamidobenzoyl chloride
o-fluoro-p-chlorobenzoyl chloride
o-methoxy-p-chlorobenzoyl chloride
o-acetoxy-p-chlorobenzoyl chloride
2,4,5-trichlorobenzoyl chloride

EXAMPLE 7

[1-(p-chlorobenzoyl)-5-methoxy-3-oxindolyl] acetic acid

A solution of 0.04 mole of benzyl [1-(p-chloro-benzoyl)-5-methoxy-3-oxindolyl] acetate in 200 ml. of glacial acetic acid and 0.5 ml. of concentrated sulfuric acid is shaken with 4 g. of a 10% palladium-on-charcoal catalyst under 4 atmospheres of hydrogen until 1 mole is absorbed. The reaction mixture is then filtered onto 4 g. of sodium acetate and the solvent removed in vacuo. The residue is shaken with 300 ml. of ether and 150 ml. of water, the ethereal layer dried over sodium sulfate and petroleum ether added to precipitate [1-(p-chlorobenzoyl)-5-methoxy-3-oxindolyl] acetic acid.

Similarly, treatment of other benzyl esters produces the following acids:

(1-benzoyl-5-fluoro-3-oxindolyl) acetic acid;
[1-(p-methylthiobenzoyl)-5-nitro-3-oxindolyl] acetic acid;
α-[1-(2,4-dichlorobenzoyl)-5-dimethylamino-3-oxindolyl] propionic acid;
α-[1-(2-thenoyl)-5-methyl-3-oxindolyl] propionic acid;
α-[1-(p-dimethylsulfamylbenzoyl)-5-chloro-3-oxindolyl]-α-(2,3-dimethylpentyl) acetic acid;
α-[1-(p-carbomethoxybenzoyl)-5-cyclopropyl-3-oxindolyl] acetic acid.

EXAMPLE 8

Ethyl-[1-(p-chlorobenzoyl)-5-hydroxy-3-oxindolyl] acetate

A solution of 0.33 mole of ethyl-(1-p-chloro-benzoyl-5-methoxy-3-oxindolyl) acetate in 200 ml. of dry benzene is gradually added to a well-stirred mixture of 0.84 mole of anhydrous aluminum bromide in 800 ml. of dry benzene and refluxed for three hours. After cooling, the mixture is poured cautiously into a mixture of ice and concentrated hydrochloric acid and the benzene layer extracted with 10% sodium hydroxide solution. The precipitate produced by neutralization with concentrated hydrochloric acid is ethyl-[1-(p-chlorobenzoyl)-5-hydroxy-3-oxindolyl] acetate.

EXAMPLE 9

Ethyl-α-[1-(p-chlorobenzoyl)-5-amino-3-oxindoyl] acetate

A total of 0.025 mole of ethyl-[1-(p-chlorobenzoyl)-5-nitro-3-oxindoyl] acetate in 100 ml. of ethanol is hydrogenated at 25° C. and atmospheric pressure in the presence of 0.5 g. of palladium-on-charcoal. After completion of the hydrogenation, the catalyst is filtered off and the solvent evaporated in vacuo to yield ethyl-[1-(p-chlorobenzoyl)-5-amino-3-oxindolyl] acetate.

Similarly, the following compounds are prepared:

benzyl-α-[1-(5-acetyl-2-furoyl) - 5 - amino - 3 - indolyl] propionate;
t-butyl-α-[1-oxazole-4-carbonyl) - 5 - amino-3-oxindolyl] n-butyrate.

EXAMPLE 10

Ethyl-α-[1-(p-chlorobenzoyl)-5-(1'-pyrrolidino)-3-oxindolyl] acetate

Add 0.005 mole of ethyl-[1-(p-chlorobenzoyl)-5-amino-3-oxindolyl] acetate, 1 g. of 1,4-dibromobutane and 0.975 g. of anhydrous sodium carbonate to 80 ml. of ethanol and stir at reflux in a nitrogen atmosphere for six hours. Filter, concentrate the filtrate, in vacuo, to a small volume and dilute with ether. The solution is twice washed with water, dried over anhydrous sodium sulfate and concentrated in vacuo to dryness, to produce ethyl-[1-(p-chlorobenzoyl)-5-(1'-pyrrolidino)-3-oxindolyl] acetate.

When ethylene dibromide is used instead of dibromobutane, the product obtained is the 5-(azacyclopropyl)-3-oxindolyl acetate compound.

EXAMPLE 11

(A) Ethyl-[1-(p-chlorobenzoyl)-5-bis(β - hydroxethyl)-amino-3-oxindolyl] acetate A mixture of 0.02 mole of ethyl-[1-(p-chlorobenzoyl)-5-amino-3-oxindolyl] acetate, 0.05 mole of ethylene oxide and 0.03 mole of acetic acid in 300 ml. of dimethoxyethane is heated in an autoclave to 100° C. for 18 hours. The mixture is then diluted with water and filtered to yield ethyl-[1-(p-chlorobenzoyl)-5-bis(β-hydroxyethyl)-amino-3-oxindolyl] acetate.

When an equivalent amount of propylene oxide is used in this process in place of ethylene oxide, ethyl-[1-(p-chlorobenzyl)-5-bis(β-hydroxypropyl)amino - 3 - oxindolyl] acetate is produced.

15

(B) Ethyl-[1-(p-chlorobenzoyl) - 5 - (4' - methyl-1'-piperazinyl)-3-oxindolyl] acetate The product of part A is stirred with two moles of p-toluenesulfonyl chloride in pyridine until the reaction is substantially complete. The mixture is poured into water and the 5-bis(p-toluenesulfonyloxyethyl)amino compound is isolated, dissolved in benzene and 1 mole of methylamine added. The mixture is allowed to stand at room temperature for three days, then poured into iced water containing two equivalents of sodium carbonate and extracted with ether immediately. Evaporation of the ether yields ethyl-[1-(p-chlorobenzoyl) - 5 - (4' - methyl-1'-piperazinyl)-3-oxindolyl] acetate.

EXAMPLE 12

Ethyl-[1-(p-chlorobenzoyl) - 5 - (4' - morpholinyl)-3-oxindolyl] acetate

A total of 0.1 mole of p-tosyl chloride in 200 ml. of benzene is added dropwise, with stirring, to a solution of ethyl-[1-(p-chlorobenzoyl) - 5 - bis($\beta$ - hydroxyethyl) amino-3-oxindolyl] acetate (0.1 mole) and pyridine (0.3 mole) in 300 ml. benzene over a period of one hour, at room temperature. The mixture is then heated under reflux for three hours, washed with water, dried over sodium sulfate and evaporated to produce ethyl-[1-(p-chlorobenzoyl)-5-(4'-morpholinyl)-3-oxindolyl] acetate.

EXAMPLE 13

(A) Sodium-[1-(p-chlorobenzoyl) - 5 - methoxy - 3 - oxindolyl] acetate

To (0.005 mole) of 1-(p-chlorobenzoyl)-5-methoxy-3-oxindolyl acetic acid in 100 ml. of methanol is added 0.005 mole of sodium hydroxide in 50 ml. of methanol, with stirring and cooling. The resulting solution is filtered and the filtrate lyophilized to give sodium [1-(p-chlorobenzoyl)-5-methoxy-3-oxindolyl] acetate.

In a similar fashion, there may be prepared the aluminum and calcium salts as well as other salts, such as the potassium, iron and magnesium salts, of the various oxindolyl acids described in the previous examples.

(B) $\beta$ - Diethylaminoethyl - [1 - (p - chlorobenzoyl)-5-methoxy-3-oxindolyl] acetate To a soltuion of [1-(p-chlorobenzoyl)-5-methoxy-3-oxindolyl] acetic acid (0.01 mole) in 100 ml. of ether at 0° C. is added a solution of 0.01 mole of N,N-diethylethanolamine in 50 cc. of ether, dropwise, with stirring. The mixture is filtered, and the resulting salt of $\beta$-diethylaminoethyl-[1-(p-chlorobenzoyl) - 5 - methoxy - 3 - oxindoyl] acetate is isolated by drying the filtrate in vacuo.

In a similar fashion, there may be prepared salts of organic bases, such as triethylamine, morpholine, n-butylamine, 2,3-xylidene, choline and piperazine by the reaction of these compounds with the various 3-oxindolyl acids described in the accompanying examples.

EXAMPLE 14

Ethyl-(5-methoxy-3-oxindolyl) glyoxalate

To a stirred solution of 0.005 mole of oxalyl chloride in 15 ml. of anhydrous ether is added a solution of 0.005 mole of 5-methoxyoxindole in 15 ml. of ether over a period of approximately 30 minutes with ice cooling. The mixture is stirred for several hours under a blanket of nitrogen and then concentrated to approximately one-half the volume. A solution of 0.01 mole of sodium ethoxide in 20 ml. of ethyl alcohol is added and the mixture is stirred for several hours more. After removal of sodium chloride by filtration the solution is evaporated to a residue and chromatographed on an alumina column to give ethyl-(5-methoxy-3-oxindolyl) glyoxalate.

Similarly, the above procedure is followed using any other alcohols to produce the corresponding oxindolyl glyoxalates.

16

EXAMPLE 15

Ethyl-(5-methoxy-3-oxindolyl)-$\alpha$-(dimethylamino)acetate (A) Ethyl-(5-methoxy-3-oxindolyl-$\alpha$-amino - acetate.—A mixture of 0.01 mole of ethyl-(5-methoxy-3-oxindolyl) glyoxalate, 0.02 mole of hydroxylamine hydrochloride, 20 ml. of ethanol and 5 ml. of pyridine is heated on the steam bath under nitrogen for three hours. The mixture is concentrated in vacuo to about 10 ml. and poured into 250 ml. of a stirred ice-water mixture. After the ice has melted, the organic material is collected, washed with water, dried, dissolved in 25 ml. of ethanol and 0.02 mole of 38% hydrochloric acid. The mixture is then reduced in a 3000 p.s.i. hydrogen atmosphere at room temperature in the presence of 1 g. of 5% palladium-on-charcoal, filtered and has 50 ml. of a 2.5 N hydrochloric acid solution added. The solution is washed twice with 50 ml. portions of chloroform, cooled, made slightly alkaline with concentrated ammonium hydroxide and extracted three times with 50 ml. portions of chloroform. The chloroform extracts are combined, washed twice with 100 ml. portions of water, dried over anhydrous potassium carbonate, filtered and concentrated in vacuo to give ethyl-(5-methoxy-3-oxindolyl)-$\alpha$-aminoacetate.

Similarly, using other glyoxalates with the corresponding alcohol solvent in the above procedure gives the corresponding oxindolyl-$\alpha$-amino esters.

(B) Ethyl-(5-methoxy-3-oxindolyl)-$\alpha$-(dimethylamino) acetate.—A mixture of 0.01 mole of ethyl-(5-methoxy-3-oxindolyl)-$\alpha$-aminoacetate, 0.022 mole of methyl iodide and 0.03 mole sodium bicarbonate in 50 ml. anhydrous 1,2-dimethoxyethane is heated on the steam bath, under nitrogen for five hours. After filtering, the solvent is removed in vacuo and the residue is chromatographed to give ethyl-(5-methoxy - 3 - oxindolyl)-$\alpha$-(dimethylamino) acetate.

Similarly, using the procedure of this part and replacing methyl iodide with other alkyl iodides, other substituted amino compounds are produced, for example: methyl-(5-fluoro-3-oxindolyl)-$\alpha$-(dibutylamino)-acetate.

EXAMPLE 16

Ethyl-[1-(p-chlorobenzoyl)-5-methoxy-3-oxindolyl]-$\alpha$-(dimethylamino)acetate This compound is prepared via the procedure of Example 5, utilizing ethyl-(5-methoxy-3-oxindolyl)-$\alpha$-(dimethylamino)acetate as the starting compound.

Similarly, the following products are prepared:

Ethyl-[1-(p-methylthiobenzoyl)-5-methoxy-3-oxindolyl]-$\alpha$-(dimethylamino)acetate;
Benzyl-[1-(N,N-dimethyl-p-carboxamidobenzoyl)-5-methyl-3-oxindolyl]-$\alpha$-(diethylamino)acetate.

EXAMPLE 17

[1-(p-chlorobenzoyl)-2-methylthio-5-methoxy-3-indolyl]-acetic acid (A) Benzyl - (5-methoxy-3-indolyl)acetate.—A solution of 25 g. of p-methoxyphenylhydrazine hydrochloride and 20 g. of benzyl-$\gamma$,$\gamma$-diethoxy butyrate in 250 ml. of 2 N hydrogen chloride in benzyl alcohol is heated on a steam bath for a few minutes. An exothermic reaction takes place with the separation of ammonium chloride. The reaction flask is removed from the steam bath and the mixture allowed to reflux gently until the initial reaction subsides. The mixture is again heated on a steam bath under reflux for thirty minutes and then concentrated in vacuo to a volume of about 80 ml. The concentrate is diluted with about 400 ml. of water, extracted with ether and the resulting ethereal extract washed with a saturated solution of sodium bicarbonate, then with water and dried over anhydrous sodium sulfate. The dried solution is filtered and evaporated to produce benzyl-(5-methoxy-3-indolyl)acetate.

(B) Benzyl-[1-(p-chlorobenzoyl)-5-methoxy-3-indolyl]

acetate.—The product of part A of this example is treated according to the procedure of Example 5 to produce benzyl-[1-(p-chlorobenzoyl)-5-methoxy-3-indolyl]acetate.

(C) 1-(p-chlorobenzoyl)-5-methoxy-3-indolyl acetic acid.—The ester obtained in part B above is added to 20 ml. of ethyl acetate containing a drop of acetic acid and reduced catalytically at room temperature in the presence of a palladium-on-charcoal catalyst. When the reduction is complete, the catalyst is filtered off and the filtrate evaporated to a crystalline residue, 1-(p-chlorobenzoyl)-5-methoxy-3-indolyl acetic acid.

(D) [1-(p-chlorobenzoyl)-2-methylthio-5-methoxy-3-indolyl]acetic acid.—A solution of 0.005 mole of the acid prepared in part C in 20 ml. of chloroform at 0° C. is mixed with 0.005 mole of methyl sulfinyl chloride in chloroform (10 ml.), dropwise. After the addition is complete, the mixture is washed with water and dried. The solution is evaporated in vacuo to a residue and chromatographed to produce [1-(p-chlorobenzoyl)-2-methylthio-5-methoxy-3-indolyl]acetic acid.

In like manner, following this procedure, the following compounds are prepared, using other alkyl sulfinyl chlorides and other indolyl acids prepared by the procedures of this example:

α-[1-(p-chlorobenzoyl)-2-benzylthio-5-fluoro-3-indolyl] propionic acid;

α-[1-(α-naphthoyl)-2-isopropylthio-5-(1-dimethylamino)-3-indolyl]acetic acid;

α-[1-(benzoxazole-2-carbonyl)-2-cyclopentylthio-5-methoxy-3-indolyl]hexanoic acid.

EXAMPLE 18

(A) Ethyl-[1-(p-chlorobenzoyl)-2,5-dimethoxy-3-indolyl]acetate

A total of 0.1 mole of ethyl-[1-(p-chlorobenzoyl)-5-methoxy-3-oxindolyl]acetate is mixed with 0.3 mole of potassium metal in 100 ml. of dimethoxyethane. Methyl bromide (0.12 mole) is added, and the mixture is refluxed for two hours, filtered and 50 ml. of water added to the filtrate to precipitate ethyl-[1-(p-chlorobenzoyl)-2,5-dimethoxy-3-indolyl]acetate. The solvent is removed in vacuo to isolate the product.

Similarly, by using other bromides, such as butyl, isopropyl and benzyl, the corresponding 1-acylated-2-alkoxy-3-indolyl esters are produced.

EXAMPLE 19

1-(p-chlorobenzoyl)-2,5-dimethoxy-3-indolyl acetic acid

A mixture of 0.005 mole of t-butyl-1-(p-chlorobenzoyl)-2,5-dimethoxy-3-indolyl acetate and 1 g. of fine porous plate chips is heated slowly, under nitrogen, until isobutylene starts to escape. It is then stirred and heated at that temperature for one hour. After cooling, the residue is extracted with saturated sodium bicarbonate solution. The aqueous solution is washed with 100 ml. of chloroform, made acidic with 2.5 N hydrochloric acid and extracted with 150 ml. of ether. The ether extract is washed twice with 75 ml. of water, dried over anhydrous sodium sulfate, filtered and the solvent removed in vacuo to leave a residue of 1-(p-chlorobenzoyl)-2,5-dimethoxy-3-indolyl acetic acid.

In like manner, any other t-butyl ester will yield the corresponding free acid when substituted in the above process.

EXAMPLE 20

1-(p-chlorobenzoyl)-2,5-dimethoxy-3-indolyl acetic acid anhydride

Dicyclohexyl carbodiimide (0.005 mole) and 0.1 mole of 1-(p-chlorobenzoyl)-2,5-dimethoxy-3-indolyl acetic acid in 20 ml. of tetrahydrofuran is allowed to stand at room temperature for 2 hours. The precipitate is filtered off and the filtrate evaporated in vacuo to leave a residue of the desired anhydride.

In a similar manner anhydrides of all of the other indolyl acids of these examples are prepared.

EXAMPLE 21

Preparation of amides (A) [1-(p-chlorobenzoyl)-5-methoxy-3-oxindolyl]acetamide.—Isobutyl chloroformate (0.07 mole) is added to a cold, nitrogen-blanketed solution of 1-(p-chlorobenzoyl)-5-methoxyoxindole-3-acetic acid and an equimolar quantity of triethylamine in 40 ml. of anhydrous 1,2-dimethoxyethane. After stirring in the cold for 20 minutes, the mixture is filtered and the filtrate immediately placed in a nitrogen atmosphere. The filtrate is taken up in 10 ml. of 1,2-dimethoxyethane and ammonia gas is bubbled through, with stirring at about 5° C. over a period of about ten hours. The solvent is then removed in vacuo to leave [1-(p-chlorobenzoyl)-5-methoxy-3-oxindolyl]acetamide.

By adding 0.008 mole of any of the following compounds, in place of the ammonia in the above procedure and stirring the mixture at 5° C. for 16 hours, the corresponding amides are formed: morpholine, isopropylamine, ethanolamine, diethanolamine, benzylamine, piperidine and substituted piperidines, pyrrolidine and substituted pyrrolidines, piperazine and substituted piperazines, aniline and substituted anilines, phenethylamine and substituted phenethylamines, cyclohexylamine, lower alkyl amines, glucosamine and substituted glucosamines, tetrahydrofurfurylamine and β-methoxyethylamine.

(B) By using the other esters with different substituents on the 1- and 5-positions in the procedure of part A, the amides of the following esters are prepared:

t-butyl-α-[1-(β-naphthoyl)-2-isopropoxy-5-nitro-3-indolyl]propionate;

benzyl-α-[1-(p-methylthiobenzoyl)-2-phenyloxy-5-benzyloxy-3-indolyl]pentanoate;

cyclopropyl-α-[1-(2-phenylthiazole-4-carboxy)-2-m-tolyloxy-5-chloro-3-indolyl]-α-t-butyl acetate;

n-pentyl-α-[1-(3,4,5-trimethoxybenzoyl)-2-benzyloxy-5-cyclopropylmethloxy-3-indolyl]-α-n-hexyl acetate;

p-tolyl-α-[1-(1-methylbenzimidazole-2-carboxy)-2-cyclohexyloxy-5-diethylsulfamyl-3-indolyl]propionate;

β-dimethylaminoethyl-α-[1-(3-thenoyl)-2-ethoxy-5(1-azacyclopropyl)-6-trifluoromethyl-3-indolyl]-α-tri-ethylmethyl acetate;

o-carboxphenyl-α-[1-(thiazole-2-carboxy)-2-p-tolyloxy-4-methyl-5-(1'-pyrrolidino)-3-indolyl]-n-octanoate.

EXAMPLE 22

Preparation of esters (A) Benzyl-[1-(p-chlorobenzoyl)-2,5-dimethoxy-3-indolyl]acetate.—A mixture of 0.1 mole of sodium benzylate in 100 ml. of dimethoxyethane is gradually added, with stirring to 500 ml. of dimethoxyethane, at 0° C.–5° C., containing 0.1 mole of the anhydride of 1-(p-chlorobenzoyl)-2,5-dimethoxy-3-indolyl acetic acid, under nitrogen. The mixture is stirred at 20° C.–25° C. for two hours, concentrated in vacuo, and diluted with 500 ml. of ether. The mixture is washed with aqueous sodium bicarbonate, dried over sodium sulfate and evaporated to give benzyl-[1-(1-chlorobenzoyl)-2,5-dimethoxy-3-indolyl]acetate.

(B) When the sodium salts of other alcoholates are used in the above reaction, in place of sodium benzylate the following compounds are similarly prepared:

ethyl-α-[1-(p-trifluoromethylbenzoyl)-2-cyclo-propoxy-5-methoxy-3-indolyl]propionate;

cyclopentyl-α-[1-(p-fluorobenzoyl)-2-methyl-mercapto-5-(4-morpholinyl)-3-indolyl]-α-isobutyl acetate.

(C) In like manner, any anhydride of an α-(1-acylated-2-substituted-3-indolyl)lower aliphatic acid compound of this invention may be converted to an ester by reaction with the sodium salts of the following compounds:

N-(β-hydroxyethyl)piperidine;
N-(β-hydroxyethyl)pyrrolidine;
N-(β-hydroxyethyl)morpholine;
N-ethyl-3-hydroxymethyl piperidine;
N-methyl-2-hydroxymethyl piperidine;
N-ethyl-3-hydroxymethyl piperidine;
N-ethyl-3-hydroxy piperidine;
3-hydroxy quinuclidine;
N-(β-hydroxyethyl)-N'-methyl piperazine.

EXAMPLE 23

[1-(p-chlorobenzoyl)-2-mercapto-5-methoxy-3-indolyl] acetic acid (A) β-(5-methoxy-3-indolyl)ethyl benzyl ether.—A mixture of 0.1 mole of p-methoxyphenylhydrazine hydrochloride, 0.1 mole of the benzyl ether of 4,4-dimethoxy butanol and 120 ml. of i-propanol is heated at reflux under nitrogen for five hours. The mixture is concentrated in vacuo, poured into water and extracted with ether. The ether solution is washed with dilute hydrochloric acid, sodium bicarbonate, water and then dried. Evaporation of the solvent and chromatography of the residue on an alumina column gives β-(5-methoxy-3-indolyl)ethyl benzyl ether.

(B) β-(5-methoxy-3-indolyl)ethyl tetrahydropyranyl ether.—The product of A in 50 ml. of ethyl acetate is hydrogenated in the presence of 3.0 g. of palladium-on-charcoal, under one atmosphere of hydrogen. After the theoretical amount of hydrogen is taken up, the mixture is filtered to remove the catalyst and the filtrate is evaporated in vacuo. The residue is mixed with 25 ml. of 2,3-dihydropyran. A few drops of concentrated hydrochloric acid are added and the solution is stirred for six hours. The mixture is then concentrated in vacuo to produce β-(5-methoxy-3-indolyl)ethyl tetrahydropyranyl ether.

(C) β-(2-mercapto-5-methoxy-3-indolyl)ethyl tetrahydropyranyl ether.—Sulfur (1.3 g.), washed with ammonium hydroxide, dried in vacuo over sulfuric acid and mixed with 50 ml. of ether, is heated on a water bath with 0.03 mole of the product obtained by the reaction of 0.04 mole of β-(5-methoxy-3-indolyl)ethyl tetrahydropyranyl ether and 6 g. of ethyl magnesium bromide in ether. After the sulfur has disappeared, the mixture is cooled, 4 g. of acetyl chloride in 50 ml. of ether added and the mixture heated on the water bath for six hours. The resulting mixture is washed with an aqueous solution of saturated sodium bicarbonate and the aqueous layer extracted with 50 ml. of ether. The combined ether solutions are evaporated and the residue added to the solid remaining after the aqueous layer is evaporated. This solid is dissolved in 100 ml. of ethyl alcohol, 25 ml. of 2.5 N sodium hydroxide is added and the mixture refluxed for two hours. The mixture is concentrated in vacuo, poured into iced water and neutralized with acetic acid. The product is extracted with ether, washed, dried and chromatographed on a silica gel column to produce β-(2-mercapto-5-methoxy-3-indolyl)ethyl tetrahydropyranyl ether.

(D) β - [1 - (p-chlorobenzoyl)-2-thiocarbobenzyloxy-5-methoxy - 3 - indolyl]ethyl tetrahydropyranyl ether.—To 0.01 mole of the ether prepared in part C, in 25 ml. of pyridine, is added 0.02 mole of carbobenzyloxy chloride. The mixture is refluxed for one-half hour, poured into iced water and extracted with ether. The ether solution is washed with dilute acetic acid, sodium bicarbonate and dried. Evaporation of solvent and chromatography on an alumina column gives β-(2-thiocarbobenzyloxy-5-methoxy-3-indolyl)ethyl tetrahydropyranyl ether.

To a solution of 0.01 mole of this product in 150 ml. DMF, 0.012 mole of a 51% sodium hydride-mineral oil suspension in 15 ml. of dimethylformamide is added, and the mixture is stirred for one hour at 0° C. Then 0.012 mole of p-chlorobenzoyl chloride in 50 ml. of DMF is added, dropwise, over a period of thirty minutes and the mixture stirred for another half hour at 0° C., allowed to stand for twelve hours at 0° C., diluted with 500 ml. ether and then filtered. The solids are washed with ether and the washings added to the filtrate, which is then washed with water and dried over sodium sulfate, the salt filtered off and the filtrate concentrated to dryness which is chromatographed on an alumina column to yield β-[1-(p-chlorobenzoyl) - 2 - thiocarbobenzyloxy - 5 - methoxy - 3-indolyl]ethyl tetrahydropyranyl ether.

(E) [1 - (p - chlorobenzoyl) - 2 - mercapto - 5 - methoxy-3-indolyl]acetic acid.—The residue from part D is added to 100 ml. of a 1% hydrochloric acid in methanol solution and the temperature maintained at 5° C., with stirring for two hours. The solution is evaporated in vacuo and redissolved in benzene. Then 0.04 mole of dicyclohexylcarbodiimide and 0.008 mole of dimethyl sulfoxide in 100 ml. of benzene, containing 5 ml. of 0.1 molar phosphoric acid, is added, and the mixture is allowed to stand at room temperature for 30 minutes. After one-half hour, a solution containing 0.01 mole of silver nitrate in a mixture of 100 ml. of ethyl alcohol and 10 ml. of water is added, then 5 cc. of ammonium hydroxide, dropwise. After maintaining the temperature at 30° C. for two hours, hydrogen sulfide is bubbled through the mixture. The silver sulfide is filtered off, the filtrate shaken with sodium bicarbonate, the aqueous portion acidified and extracted with ether and the ether solution evaporated in vacuo. The residue is taken up in 100 ml. of methanol and hydrogenated in the presence of 0.5 ml. of concentrated hydrochloric acid and 3 g. of a 10% palladium-on-charcoal catalyst. After completion of the hydrogenation, the catalyst is filtered off and the solvent evaporated in vacuo to produce (1 - p - chlorobenzoyl - 2 - mercapto - 5 - methoxy-3-indolyl)acetic acid.

(F) In like manner, by utilizing the procedures of this example, the following α - (1 - acylated - 2 - mercapto - 3-indolyl) lower aliphatic acids and derivatives are produced:

α-(1-thenoyl-2-mercapto-5-methoxy-3-indolyl)propionic acid;
(1-p-methylthiobenzoyl-2-mercapto-5-fluoro-3-indolyl) acetic acid.

What is claimed is:
1. A compound selected from the group represented by the formula

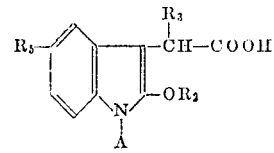

wherein
A is ArCO or HetCO wherein Ar is phenyl, naphthyl or substituted phenyl where the substituent is halogen, methylthio, dilower alkylsulfamyl or carblower alkoxy and Het is thienyl;
$R_2$ is hydrogen, lower alkyl or cyclolower alkyllower alkyl;
$R_3$ is hydrogen or lower alkyl radical; and
$R_5$ is lower alkyl, lower alkoxy, nitro, di(lower alkyl)-amino, lower alkylacetamido, halogen or cyclopropyl.

2. A compound selected from the group represented by the formula

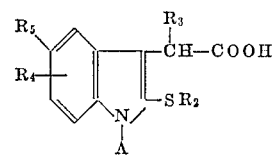

wherein
A is ArCO or HetCO wherein Ar is phenyl, halophenyl, methylthiophenyl or naphthyl; and Het is halofuroyl, thienyl, nicotinyl or benzoxazolyl;

$R_2$ is hydrogen, lower alkyl, benzyl or cyclolower alkyl;
$R_3$ is hydrogen or lower alkyl radical;
$R_4$ is hydrogen or halogen; and
$R_5$ is lower alkoxy, di(lower alkyl)amino, di(lower alkyl)aminolower alkyl or halogen.

3. A compound selected from the group represented by the formula

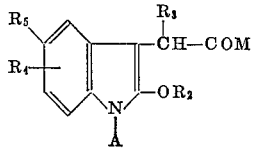

wherein
A is ArCO or HetCO where Ar is phenyl, naphthyl or substituted phenyl where the substituent is lower alkoxy, phenoxy, nitro, dilower alkylamino, halo, cyano, acetyl, acetamido, acetoxy, trihalolower alkyl, lower alkylthio, acetylmercapto, benzylthio, trifluoromethylthio, dilower alkylsulfamyl, dilower alkylsulfonamido, lower alkylsulfonyl, lower alkylsulfinyl, dilower alkylcarboxamido, formyl or carblower alkoxy, trifluoroacetyl; and Het is furyl, nitrofuryl, acetylfuryl, lower alkylimidazolyl, lower alkyloxoimidazolyl, lower alkylbenzimidazolyl, thienyl, pyrazolyl, halothienyl nicotinyl, lower alkylindazolyl, nitroindazolyl, oxazolyl, benzoxazolyl, thiazolyl, phenylthiazolyl or benzylmercaptothiazolyl;
$R_2$ is hydrogen, lower alkyl, benzyl, cylolower alkyl, phenyl, tolyl or lower alkanoyl;
$R_3$ is hydrogen, dilower alkylamino or lower alkyl radical;
$R_4$ is hydrogen, lower alkyl or trifluoromethyl radical;
$R_5$ is lower alkyl, lower alkoxy, nitro, amino, di(lower alkyl)amino, lower alkanoyl, bis(hydroxylower alkyl)amino, 1-pyrrolidino, 4-methyl-1-piperazinyl, 4-morpholino, trifluoromethyl, hydroxyl, halogen, di(lower alkyl)sulfamyl, methylthio, benzyloxy, lower alkenyl, 1-azacyclopropyl or cyclopropyllower alkoxy; and
M is lower alkoxy, benzyloxy tolyloxy, cyclopropoxy, $\beta$ - diethyl - aminoethoxy, $\beta$ - dimethylaminoethoxy, tetrahydrofurfuryloxy or o-carboxyphenoxy.

4. A compound selected from the group represented by the formula

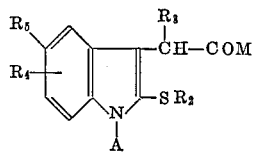

wherein
A is lower alkylthiazolyl, halobenzoyl or benzofuroyl;
$R_2$ is lower alkyl or phenyl;
$R_3$ is hydrogen or lower alkyl;
$R_4$ is hydrogen or halogen;
$R_5$ is lower alkoxy, benzyloxy or 4-morpholinyl; and
M is lower alkoxy, cyclolower alkoxy or pyrrolidinyllower alkoxy.

5. A compound selected from the group represented by the formula

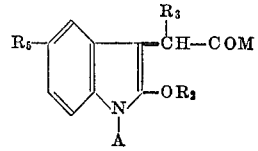

A is halobenzoyl, lower alkylbenzoyl or lower alkylthiobenzoyl;
$R_2$ is lower alkyl or phenyl;
$R_3$ is hydrogen or lower alkyl;
$R_5$ is lower alkoxy or 4-morpholino; and
M is amino, lower alkylamino, lower alkanolamino, dilower alkanolamino, benzylamino, phenethylamino, anilino, piperazino, pyrrolidino, piperidino, tetrahydrofurfurylamino, morpholino, cyclolower alkylamino, lower alkoxylower alkylamino or glucosamino.

6. $\alpha$-[1-(p-chlorobenzoyl)-5-methoxy - 3 - oxindolyl] acetic acid.

7. $\alpha$-[1-(p-methylthiobenzoyl) - 2 - methylthio-5-methoxy-3-indolyl]propionic acid.

8. $\alpha$ - [1 - (p-chlorobenzoyl)-2-methoxy-5-dimethylamino-3-indolyl]acetic acid.

9. (1-p-trifluoromethylbenzoyl-2-mercapto - 5 - fluoro-3-indolyl)acetamide.

10. $\alpha$ - [1-(p-chlorobenzoyl)-2,5-dimethoxy-3-indolyl] propionic acid.

References Cited
UNITED STATES PATENTS 3,320,278   5/1967   Ruyle et al. _____ 260—326.12

ALEX MAZEL, Primary Examiner

J. A. NARCAVAGE, Assistant Examiner

U.S. Cl. X.R.

260—247.1, 247.2, 250, 256.4, 256.5, 268, 287, 295, 302, 304, 307, 308, 309, 309.2, 310 325, 326.13, 326.15, 326.16, 999; 424—274